(12) United States Patent
Vinciarelli

(10) Patent No.: US 6,282,107 B1
(45) Date of Patent: Aug. 28, 2001

(54) INTEGRATED SENSE AND SWITCH CIRCUITRY FOR TRANSFORMER CORE RESETTING

(75) Inventor: Patrizio Vinciarelli, Boston, MA (US)

(73) Assignee: VLT Corporation, San Antonio, TX (US)

( * ) Notice: Subject to any disclaimer, the term of this patent is extended or adjusted under 35 U.S.C. 154(b) by 0 days.

(21) Appl. No.: 09/519,918

(22) Filed: Mar. 7, 2000

(51) Int. Cl.[7] .................................................. H02H 7/122
(52) U.S. Cl. ........................... 363/56.09; 363/20; 363/131
(58) Field of Search .......................... 363/20, 21, 56.09, 363/131

(56) References Cited

U.S. PATENT DOCUMENTS

| | | | |
|---|---|---|---|
| 4,975,821 | * 12/1990 | Lethellier ................................ 363/56 |
| 5,126,931 | * 6/1992 | Jitaru ...................................... 363/131 |
| 5,331,533 | * 7/1994 | Smith ...................................... 363/20 |
| 5,374,857 | * 12/1994 | Carobolante ........................... 327/110 |
| 5,434,768 | * 7/1995 | Jitaru et al. ............................. 363/21 |
| 5,734,563 | * 3/1998 | Shinada .................................. 363/21 |
| 5,774,350 | * 6/1998 | Notaro et al. ........................... 363/89 |
| 5,805,434 | 9/1998 | Vinciarelli et al. .................... 363/16 |
| 5,812,383 | * 9/1998 | Majid et al. ............................ 363/21 |
| 5,814,884 | 9/1998 | Davis et al. ........................... 257/723 |
| 5,886,383 | 3/1999 | Kinzer .................................... 257/341 |
| 5,973,939 | * 10/1999 | Jan ....................................... 363/131 |

* cited by examiner

Primary Examiner—Jeffrey Sterrett
(74) Attorney, Agent, or Firm—Fish & Richarson P.C.

(57) ABSTRACT

An integrated circuit has a MOSFET comprising a drain terminal, a source terminal and a gate control terminal, the MOSFET having an equivalent circuit that includes an intrinsic diode; and a diode comprising an anode terminal and a cathode terminal.

40 Claims, 10 Drawing Sheets

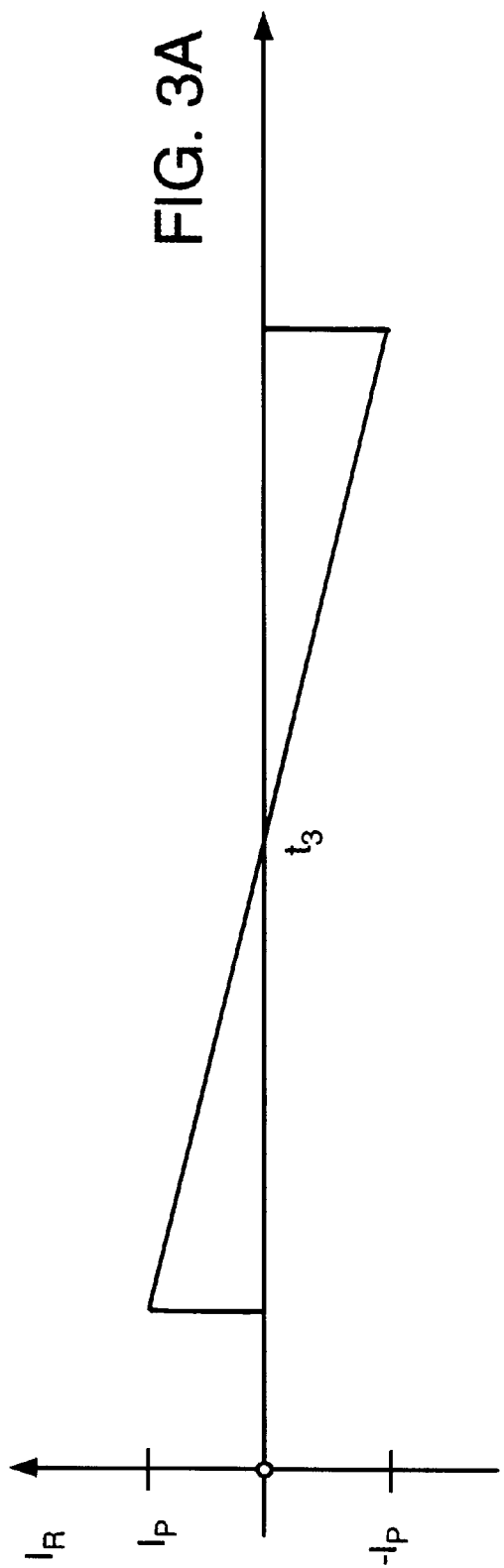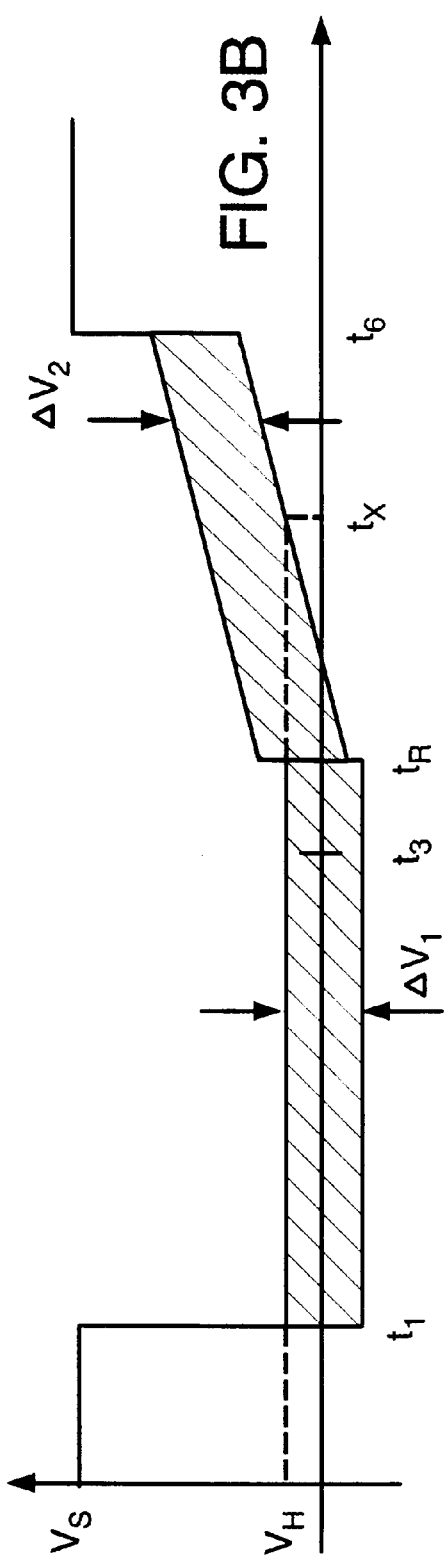

US 6,282,107 B1

INTEGRATED SENSE AND SWITCH CIRCUITRY FOR TRANSFORMER CORE RESETTING

BACKGROUND OF THE INVENTION

This patent relates to integrated transformer core resetting.

FIG. 1 shows a single ended forward power converter 10 comprising an active reset circuit 20 of the kind described in Vinciarelli, 5,805,434, "Control of Stored Magnetic Energy in Power Converter Transformers" (the "'434 Patent", incorporated in its entirety by reference). In the Figure, the reset circuit 20 comprises a MOSFET reset switch 30 and its associated intrinsic body diode 32; a clamp diode 34; a reset capacitor 36; a sense diode 38 and a source of sense current 40 of value Isense. An impedance block 42 represents circuit elements connected to the current source 40 for sensing a voltage Vs. The relative timing of the reset switch 30 and a main switch 14 are controlled, as explained in the '434 Patent, to enable the core of the transformer 12 to be reset during each operating cycle. Active core reset circuits are also described in Vinciarelli. U.S. Pat. Re. 36,098 ("the Reissue Patent", incorporated in its entirety by reference).

Idealized steady-state operating waveforms for the reset circuit 20 are shown in FIGS. 2A through 2E. During the time that the main switch 14 is turned on (e.g., between time t=0 and time t=t1) energy is transferred forward from the input voltage source, via the transformer 12, toward the load 18 and magnetizing energy builds up in the core of the transformer 12. Between time t1 when the main switch is opened, and time t3, the magnetizing energy stored in the transformer 12 is recycled in the closed resonant circuit formed by the transformer magnetizing inductance and the reset capacitor 36, resulting in a "mirroring" of the flux in the transformer. This is reflected as a reversal in the flow of magnetizing current (FIG. 2C), $I_R$, which flows in the reset circuit 20. Although the voltage across the reset capacitor 36, Vc, will vary owing to the variation in the flow of magnetizing current, and may also vary substantially with operating conditions (as explained in the '434 patent), it can, for purposes of explanation, be considered essentially constant and unipolar (FIG. 2D). As explained in the '434 patent, clamp diode 34 is used to prevent reversal of voltage across the storage capacitor, and associated undesirable side effects, under certain operating conditions in certain kinds of converters.

Because the relative timing of the opening and closing of the main switch 14 and the reset switch 30 is important (e.g., moments t4 and t5 in FIG. 2), it is beneficial to generate a signal which indicates that the main switch 14 has opened for use in determining when the reset switch 30 may be closed. As explained in the '434 patent, it is also useful to sense when the magnetizing current changes polarity as this information can be used to inhibit turn-on of the main switch as a means of preventing transformer 12 saturation under transient conditions.

Sense diode 38 and current source 40 are used to sense when the main switch 14 has opened and when the magnetizing current reverses polarity. With reference to FIG. 2E, between time t=0 and t=t1 the main switch is closed, the sense diode 38 is reverse biased and the voltage Vs is at a high level (owing to the current Isense from current source 40 flowing in sensing circuit impedance 42). Opening of the main switch 14 at time t=t1 results in a flow of magnetizing current in the intrinsic diode 32. Assuming an idealized case in which both the intrinsic diode 32 and the sense diode 38 have the same forward voltage drop, this will cause the voltage Vs to drop to essentially zero volts. At time t3, when the magnetizing current reaches zero, the voltage at the cathode of the sense diode also goes to zero and the voltage Vs takes a step equal to the forward voltage drop of the sense diode 38. Thereafter, throughout the remainder of the time that the reset MOSFET is carrying current, the voltage at the anode will rise linearly (FIG. 2E) owing to the increasing current flowing in the essentially constant on-resistance of the reset MOSFET. The cycle repeats beginning at time t5. As explained in the '434 patent, the steps in the Vs waveform at times t1 and t3 may be used to sense the opening of the main switch and the time at which the polarity of the magnetizing current reverses, respectively.

SUMMARY OF THE INVENTION

In general, in one aspect the invention features an integrated circuit having a MOSFET comprising a drain terminal, a source terminal and a gate control terminal, the MOSFET having an equivalent circuit that includes an intrinsic diode; and a diode comprising an anode terminal and a cathode terminal.

Implementations of the invention may include one or more of the following features. The integrated circuit may include a second diode having a second anode terminal and a second cathode terminal. The cathode terminal and the second cathode terminal may be connected to the drain terminal. The MOSFET may include a sensefet having two source terminals. The integrated circuit may include terminations for making connections to the drain terminal, the source terminal, the gate control terminal and the anode terminal. The integrated circuit may include terminations for making connections to both of the source terminals. The integrated circuit may include a termination for making a connection to the second anode terminal. The MOSFET may have an equivalent circuit including an intrinsic diode, the cathode of the intrinsic diode may be connected to the drain terminal, and the anode of the intrinsic diode may be connected to the source terminal.

The diode may comprise another MOFET integrated onto the die, the other MOSFET may have a channel connected between a drain terminal and a source terminal and a gate control terminal for controlling the conductivity of the channel. The other MOSFET may have an equivalent circuit having an intrinsic diode, the cathode of the intrinsic diode being connected to the drain terminal of the other MOSFET and the anode of the intrinsic diode being connected to the source terminal of the other MOSFET. The channel of the other MOSFET may be rendered non-conductive and the cathode terminal includes the drain terminal of the other MOSFET and the anode terminal includes the second source terminal of the other MOSFET. The other MOSFET may be rendered non-conductive by a connection between the gate control terminal and the source terminal of the other MOSFET.

The second diode may include an additional MOSFET integrated onto the die, the additional MOSFET including a channel connected between a drain terminal and a source terminal and a gate control terminal for controlling the conductivity of the channel. The additional MOSFET is of the kind that has an equivalent circuit comprising an intrinsic diode, the cathode of the intrinsic diode connected to the drain terminal of the additional MOSFET and the anode of the intrinsic diode connected to the source terminal of the additional MOSFET. The channel of the additional MOSFET is rendered non-conductive and the second cathode terminal comprises the drain terminal of the additional MOSFET and the second anode terminal comprises the second source terminal of the additional MOSFET. The additional MOSFET may be rendered non-conductive by means of a connection between the gate control terminal of the additional MOSFET and the source terminal of the additional MOSFET.

The circuit may include a two-terminal synchronous rectifier having a MOSFET, an intrinsic diode and conductivity control circuitry.

In general, in another aspect, the invention features a power converter having a transformer and a core reset circuit for resetting the core of the transformer. The core reset circuit includes an integrated circuit having a semiconductor die having a MOSFET comprising a channel between a drain terminal and a source terminal and a gate control terminal for controlling the conductivity of said channel, and a diode comprising an anode terminal and a cathode terminal, the cathode terminal connected to the drain terminal.

Implementations of the invention may include one or more of the following features. The channel of the MOSFET may be connected to a winding of the transformer. The diode may include a sense diode connected in series with a source of current. The core reset circuit may include a capacitor and the diode may include a clamp diode connected across the capacitor. The MOSFET may include a sensefet comprising a reset MOSFET and a sense MOSFET and the source terminal may comprise the source terminal of the reset MOSFET; and the source terminal of the sense MOSFET may provide a sense termination for use in detecting the voltage across the channel.

In general, in another aspect, the invention features a power converter having a transformer and such a core reset circuit for resetting the core of the transformer.

In general, in another aspect, the invention features a method in which, during an off period of a main switch in a power converter, the timings of a reversal of magnetizing current in a transformer of the power converter is sensed by a circuit that includes a sense diode. The transformer is reset by turning on a reset switch that includes an intrinsic diode. The sense diode and the intrinsic diodes are arranged to have forward voltage drops that are within 20 millivolts of one another. In implementations of the invention, the reset switch may be a MOSFET that is integrated with the sense diode on the same semiconductor die, and the sense diode is an intrinsic diode of another MOSFET.

BRIEF DESCRIPTION OF THE DRAWINGS

We first describe the Figures:

FIGS. 3A and 3B show waveforms for a non-ideal converter.

DETAILED DESCRIPTION

Figure 1:
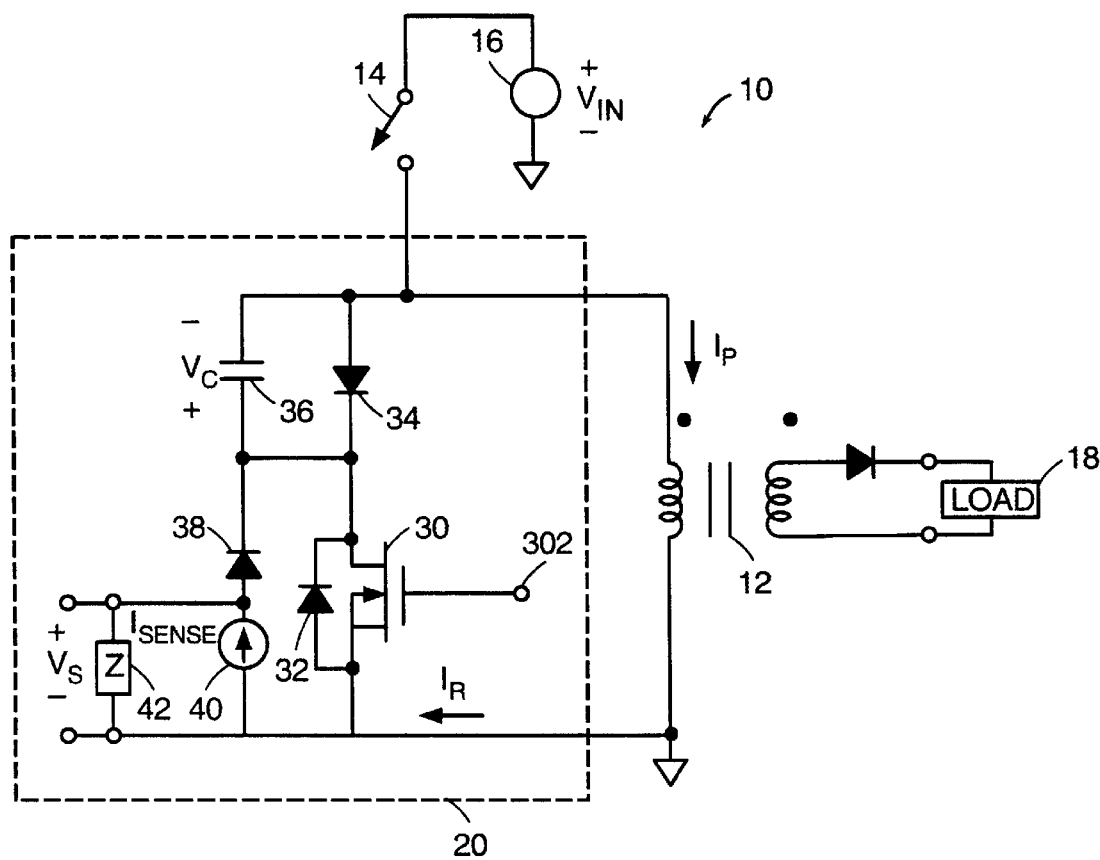
FIG. 1 shows a power converter comprising a prior art active reset circuit.
Figure 2A:
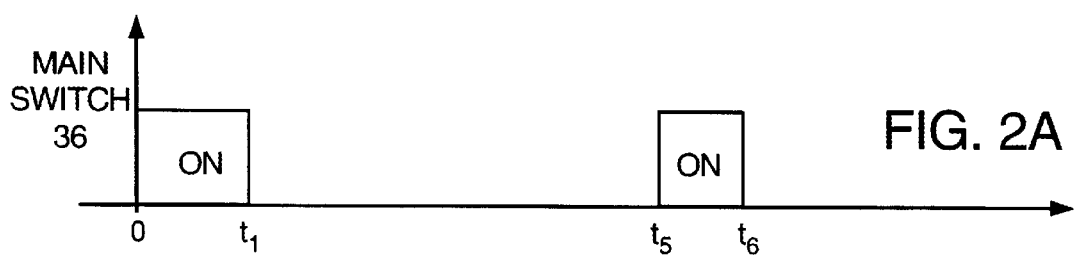
FIGS. 2A–2E shows waveforms for the converter of FIG. 1.
Figure 2B:
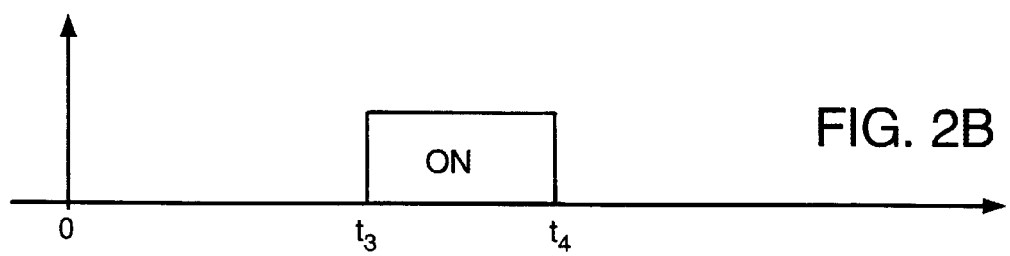
Figure 2C:
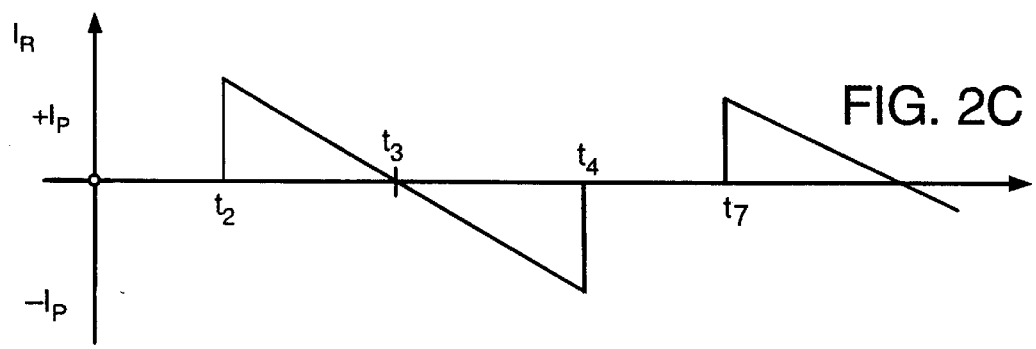
Figure 2D:
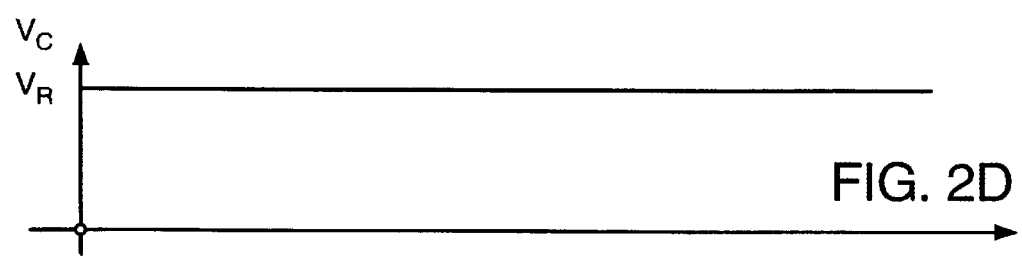
Figure 2E:
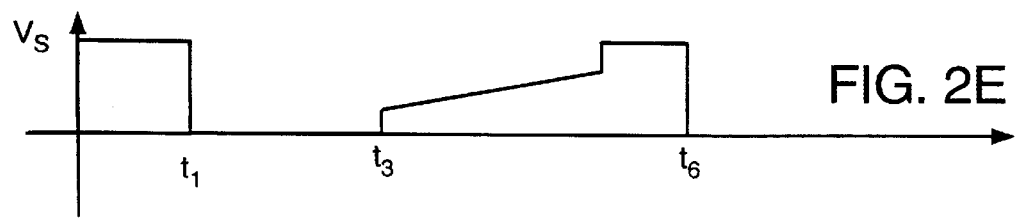

With reference to FIG. 1, assume that a non-ideal converter 10 operates from a relatively high input voltage source 16 (e.g., Vin=300 VDC) at a relatively high operating frequency (e.g. 1 MHz). Also assume that the converter comprises high voltage (e.g., a breakdown voltage rating of 600 volts) enhancement-mode MOSFET main and reset switches 14, 30 of the kind available at the time of the filing of this patent and discrete sense and clamp diodes 38, 34. The non-ideal characteristics and mismatches between components, will result in an operating performance, illustrated in FIGS. 3A and 3B, which is different from that depicted in the idealized waveforms of FIG. 2.

As shown in FIG. 3B, for example, the voltage Vs will not typically assume a value of zero between times t1 and t3, because forward voltage drops in the intrinsic diode 32 and the sense diode 38 will not be the same, the difference depending on various factors. For example, lot-to-lot variations in the forward voltage drop of a discrete sense diode 38 (i.e., variations between parts which come from different wafers) might be +/−50 millivolts. In addition, a particular type of sense diode 38 might be used with different MOSFET reset switches 30 (e.g., a 600 Volt rated MOSFET for use in a converter which operates at a nominal 300 VDC input; a 100 VDC rated MOSFET for use in a converter which operates at a nominal 48 VDC input), and the forward voltage drops of the intrinsic diodes of the different MOSFET switches might also vary by +/−50 millivolts. In addition, because the sense and intrinsic diodes are made using different processes, their forward voltage drop variations with temperature may also differ. Thus, the actual value of Vs during this period can be positive or negative within a range, $\Delta V1$, of a hundred millivolts or more.

The reverse recovery time of the MOSFET intrinsic diode 32 increases with breakdown voltage rating and, for FETs with breakdown voltages of several hundred volts, may be as great as hundreds of nanoseconds, which, in a high frequency power converter is comparable to the length of the time period between t1 and t3. Thus, as shown in FIG. 3B, the intrinsic diode 32 may continue to conduct for a period of time following the polarity reversal of $I_R$, delaying the step in Vs until time $t_R$ and providing a false indication of when polarity reversal occurs. Furthermore, because of the mismatches in component characteristics discussed above, the value of Vs following $t_R$ will also vary within a range (e.g., range $\Delta V2$, FIG. 3B), making the value of the step at time $t_R$ difficult to predict with precision. This, in turn, complicates the design of circuitry for sensing the step.

As noted earlier, it is useful to inhibit turn-on of the main switch until after the magnetizing current has reversed polarity as a means of preventing transformer saturation during transient conditions. It is also important to prevent turn-on of the main switch during times when the reset MOSFET cannot effectively be turned off. If, for example, the main switch 14 were turned on at or near the time of the polarity reversal (i.e., in FIG. 3, at or near time t3) but prior to the recovery of the intrinsic diode 34, it would result in a surge of current in both switches. This current surge will disrupt the process of recycling energy between the magnetizing inductance and the reset capacitor and will result in a burst of high frequency noise as the rapid surge of reverse current "snaps" the intrinsic diode into recovery.

The prior art reset circuit 20 can be improved by use of the integrated reset circuits 300,400 shown in FIGS. 4A, 4B and 4C and 7A, 7B and 7C.

Figure 4A:
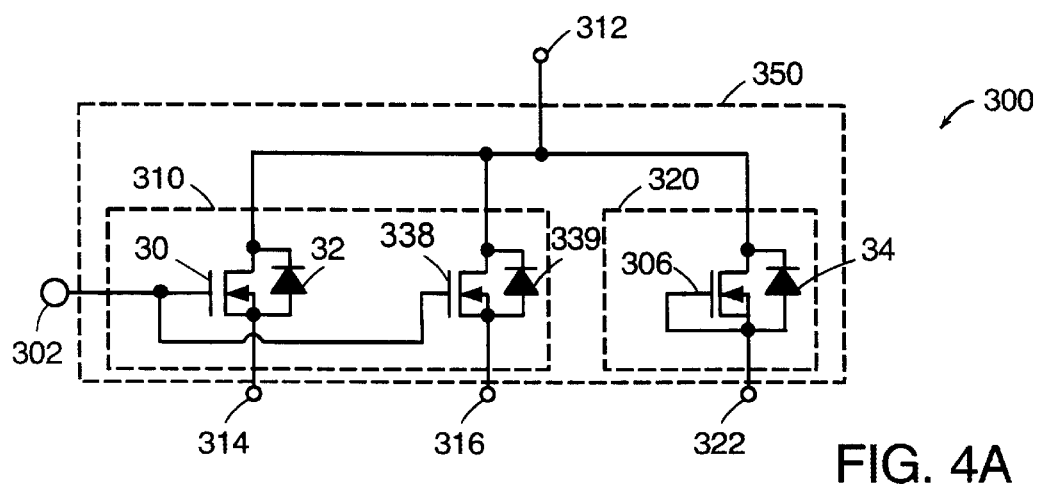
FIGS. 4A through 4C illustrate an integrated reset circuit according to the invention.
Figure 4B:
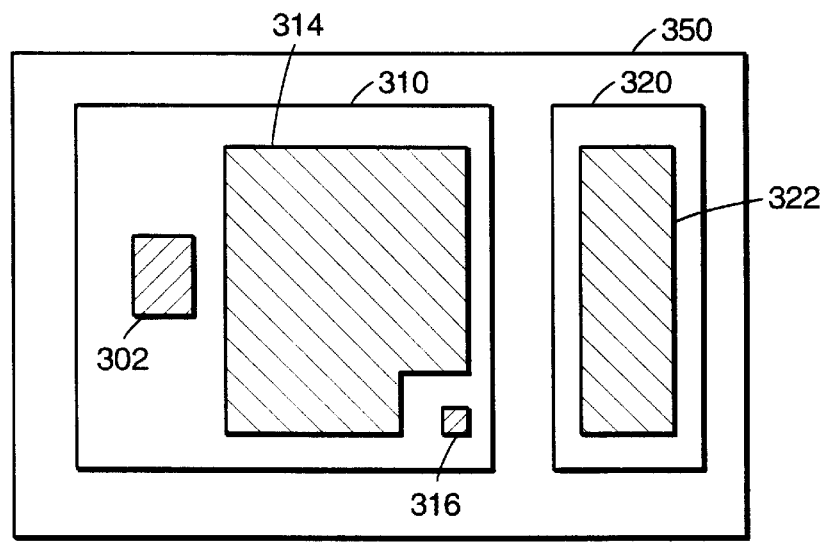
Figure 4C:
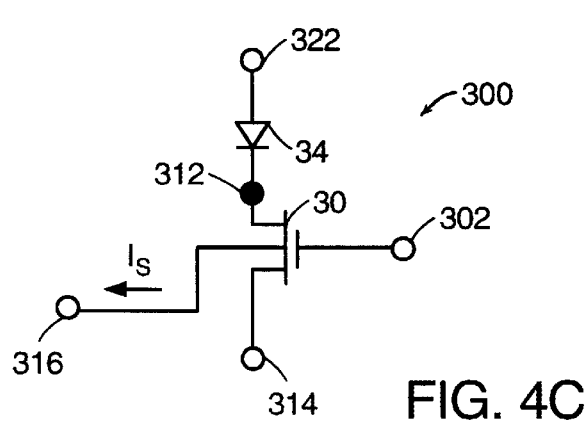

In FIGS. 4A, 4B and 4C the integrated reset circuit 300 comprises a single semiconductor die 350 (by "die" we mean a single piece of semiconductor material (e.g., silicon) onto which a circuit comprising a plurality of circuit elements (e.g., circuit 300) is integrated, and which comprises connecting pads for making electrical connections to the die (e.g., by wire bonding)) onto which are integrated two devices: a "sensefet" device 310 comprising reset MOSFET 30 and sense MOSFET 338; and a clamp diode MOSFET 320. A "sensefet" is a MOSFET in which a fraction of the current carried by the MOSFET is brought out to a separate source terminal connection (devices of this kind are described in Application Note 959B, "An Introduction to the HEXSense™ Current-Sensing Device", in the "HEXFET Power MOSFET Designer's Manual", 1993, published by International Rectifier, El Segundo, Calif., USA, incorporated in its entirety by reference). Both MOSFET devices 310, 320 share a common drain connection 312 which is located on the bottom of the die in FIG. 4B (not shown). The remainder of the connections to the die 350 are bonding pads comprising: a reset MOSFET gate control input termination pad 302; a reset MOSFEET source lead termination pad 314; a "sensefet" source lead termination pad 316; and a clamp diode MOSFET source lead termination pad 322 (which also provides a connection to the cathode of the intrinsic diode 34 of the clamp diode MOSFET). The clamp diode MOSFET gate control input 306 and source leads are connected together (e.g., by metallization on the die, not shown), permanently holding the channel of the clamp diode MOSFET 320 in a non-conductive state.

In FIG. 4B, a portion of the die 350 comprises a sensefet 310, which, as schematically shown in FIG. 4A, is equivalent to a MOSFET device which is partitioned into two sections, each section having a common gate terminal 302 and drain terminal 312, but separate source terminals 314, 316. FIG. 4C is another schematic representation of the integrated reset circuit 300 of FIG. 4B, with the source of the sense MOSFET 316 depicted as a second source connection to the reset MOSFET 30. When used in a power converter 100 (FIG. 5) the sense MOSFET source 316 is connected to a terminating impedance 42 whose value is selected to minimize current, Is, in the sense MOSFET while enabling fast response at its source 316 (the selection can be done empirically). Because of the low value of Is, the sense MOSFET will appear as an intrinsic diode (shown schematically as intrinsic diode 339, FIG. 4A) when the sense MOSFET channel is cut off and will appear as an essentially ideal switch (e.g., with essentially zero voltage drop) when its channel is enabled to conduct.

Figure 5:
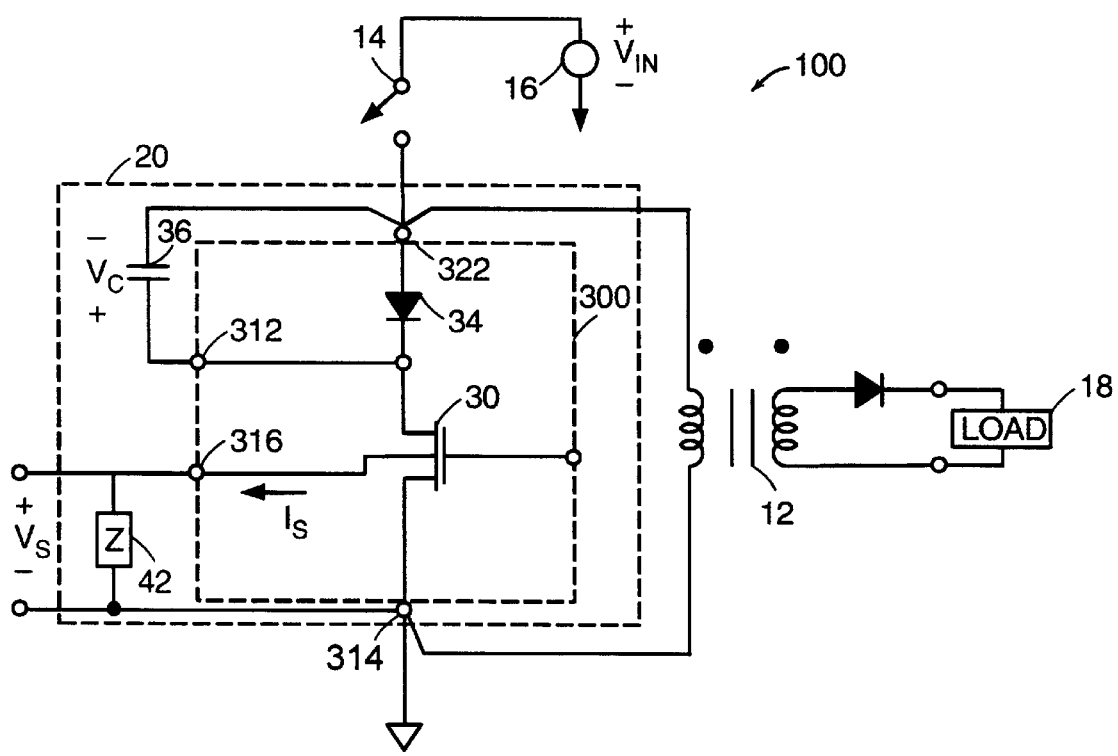
FIG. 5 is a converter comprising an integrated reset circuit.
Figure 6A:
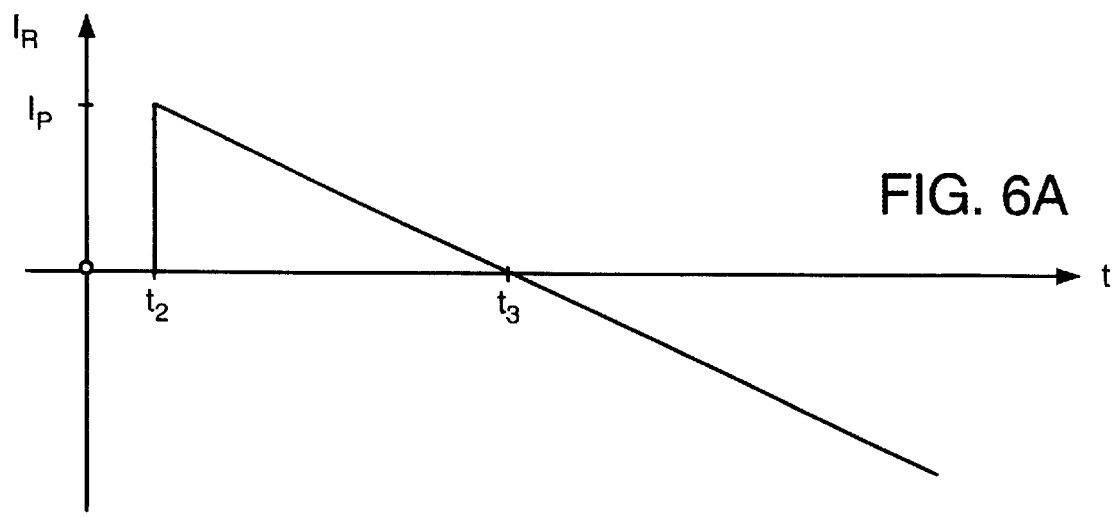
FIGS. 6A through 6C show waveforms for the converter of FIG. 6.
Figure 6B:
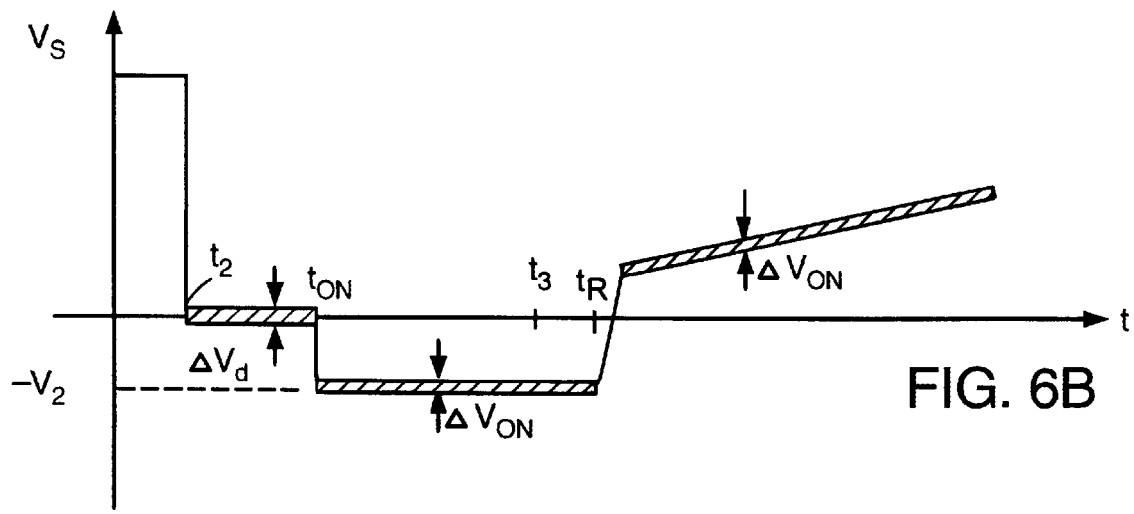
Figure 6C:
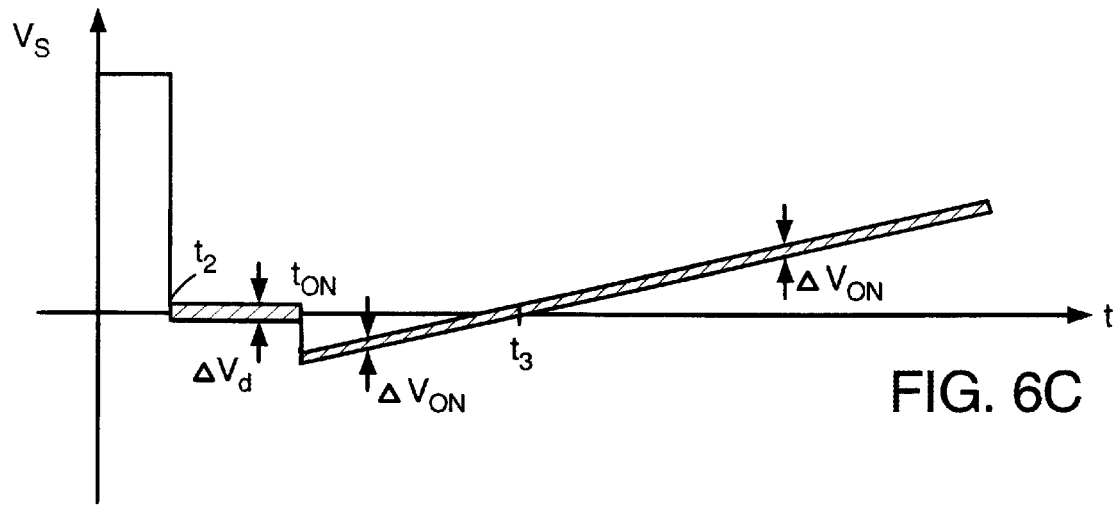

Operating waveforms for the integrated reset circuit 300 of FIG. 4, in the converter of FIG. 5, are shown in FIGS. 6A, 6B and 6C. FIGS. 6B and 6C show waveforms of the voltage Vs for MOSFET having different characteristics, as discussed below. Between time t2 and $t_{on}$ the main switch 14 is open, the reset MOSFET 30 has not yet been turned on, and reset current $I_R$ is flowing in the intrinsic diode 32 of the reset MOSFET. Because the sense MOSFET 338 is also disabled, the voltage Vs will be the difference between the forward voltage drops in the intrinsic diodes 339, 32. Since both diodes are on the same die 350 and are made at the same time with the same process steps, they will exhibit the same forward voltage characteristics, the difference between their forward voltage drops will be essentially zero, and the range of variation in the difference in their voltages, ΔVd (FIGS. 6B, 6C), will be much smaller and more predictable than the difference (ΔV1, FIG. 3B) in the prior art converter. At time $t_{on}$ a signal (not shown) at the gate control input 302 enables both the sense MOSFET 338 and the reset MOSFET 30. After time $t_{on}$, because the sense MOSFET 338 exhibits essentially zero voltage drop when enabled, the voltage Vs will closely match the drain to source voltage of the reset MOSFET (i.e., the voltage between terminals 312 and 314, FIG. 5). The characteristics and value of this voltage after $t_{on}$ is dependent on the type of MOSFET device.

FIG. 6B shows the voltage Vs for a high voltage MOSFET with a high channel resistance. Essentially all of the reset current $I_R$ continues to flow in the intrinsic diode 32 and the negative voltage Vs=−V2 is essentially equal to the forward voltage drop of the intrinsic diode. The reset current reverses polarity at time t3 (FIG. 6A) but reverse recovery of the intrinsic diode 32 is not complete until time $t_R$. At time $t_R$, a positive step in the voltage Vs occurs as the intrinsic diode 32 recovers and the reset current begins flowing in the channel of the reset MOSFET 30.

FIG. 6C shows the voltage Vs for a low voltage MOSFET with a relatively lower channel resistance. The conditions prior to $t_{on}$ are equivalent to those in FIG. 6B. After $t_{on}$, however, essentially all of the current $I_R$ flows in the channel resistance of the reset MOSFET 30 and there is essentially no conduction by the intrinsic diode 32 and no reverse recovery period. As a result, as shown in FIG. 6C. the sense voltage Vs, is always proportional to the reset current after $t_{on}$.

In both of the cases illustrated in FIGS. 6B and 6C, owing to the negligible voltage drop in the sense MOSFET 338 when enabled, the voltage Vs after time $t_{on}$ will accurately represent the voltage between the drain and the source of the reset MOSFET 30 and the range of variation in this voltage resulting from variations in characteristics between the reset MOSFET 30 and the sense MOSFET 338, ΔVon (FIGS. 6B, 6C), will be smaller than the variations in the prior art converter 10. Likewise, owing to the close matching of the intrinsic diodes 32, 339, the range of variation of Vs between t2 and $t_{on}$, ΔVd (FIGS. 6B, 6C) will also be small.

Because the integrated reset circuit 300 provides a more accurate representation of the voltage across the reset MOSFET than prior art discrete circuits, the uncertainties associated with sensing this voltage are also reduced. For example, in prior art waveforms of FIG. 3, the time $t_R$ is the actual point in time at which recovery of the reset MOSFET intrinsic diode occurs. Due to the relatively broad range of variation ΔV1, however, the threshold for sensing when the intrinsic diode recovers must be set to a value above Vs=$V_H$ (FIG. 3B). As also shown in FIG. 3B, the time at which Vs crosses this threshold, given the variation ΔV2, can occur at any time between $t_R$ and $t_x$, depending on component characteristics and operating conditions. Since the setting of this threshold determines when it is safe to enable turn-on of the main switch 14, and since unnecessary delays in enabling turn-on of the main switch affect dynamic performance of the converter during transient conditions, it follows that the greater the uncertainty in the thresholds the greater will be the potential impact on dynamic performance. As seen in FIGS. 6B and 6C, the much more accurate measurement of Vs enabled by the integrated reset circuit 300 result in much smaller variations ΔVd and Δ$V_{on}$ and allow the sensing thresholds to be set much more accurately. For example, setting the sensing threshold to zero volts would, in the case of FIG. 6B, sense the recovery time of the intrinsic diode 32 (FIG. 4A), $t_R$, and, in the case of FIG. 6C, sense the time of polarity reversal, $t_3$, with very little error.

While prior art discrete approaches exhibit threshold uncertainties of 100 millivolts or more, the close matching in component characteristics afforded by an integrated reset circuit 300 can achieve mismatch uncertainties of less than 5 millivolts. Mismatch uncertainties that are less than 20 millivolts are quite helpful compared with the mismatches that characterize discrete components. The smaller mismatches, in turn, allow specification of improved dynamic performance in both cases.

By providing for close tracking of component parameters with operating conditions (e.g., variations in forward voltage drops with temperature), integration on a single die also allows use of less complex sensing circuitry (e.g., by eliminating the need to provide temperature compensated threshold voltage values).

The clamp diode 34 in the converter 100 of FIG. 5 comprises the intrinsic diode (34, FIGS. 4A and 4C) of the clamp diode MOSFET 320 and is connected across the reset capacitor 36 by means of terminals 322 and 312 (FIG. 5).

Figure 7A:
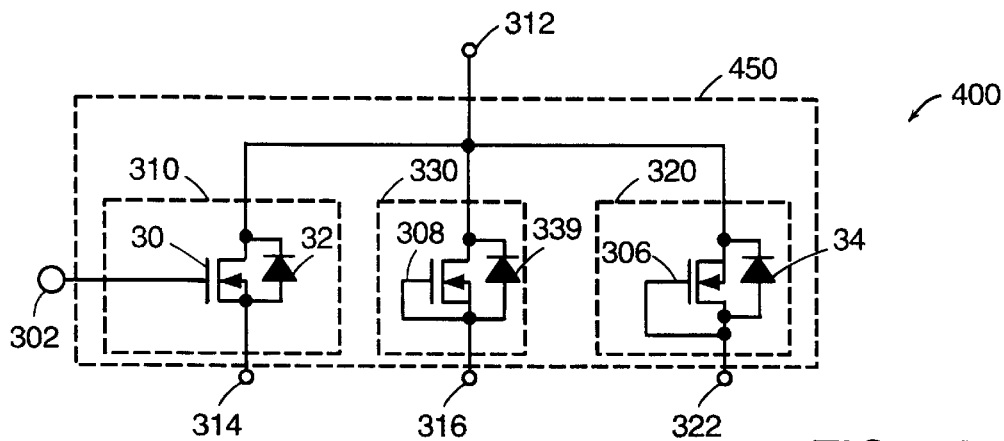
FIGS. 7A through 7C illustrate another integrated reset circuit according to the invention.
Figure 7B:
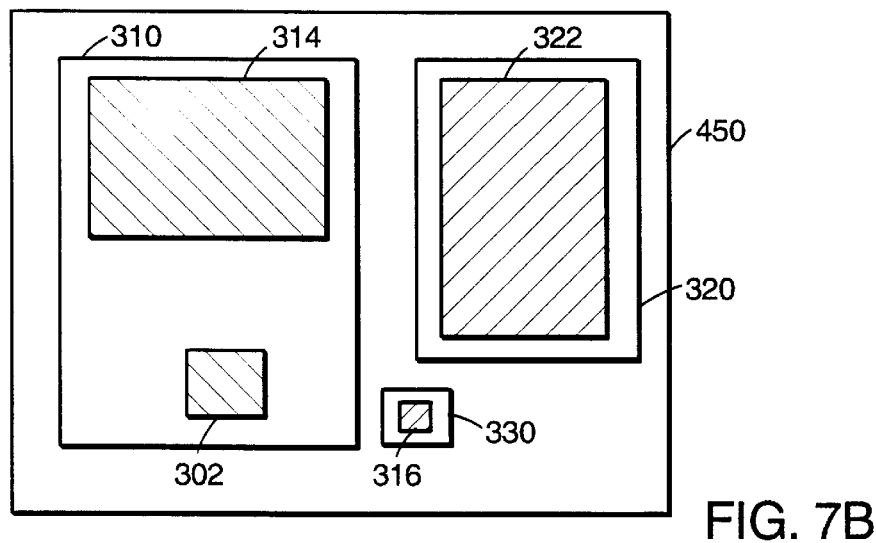
Figure 7C:
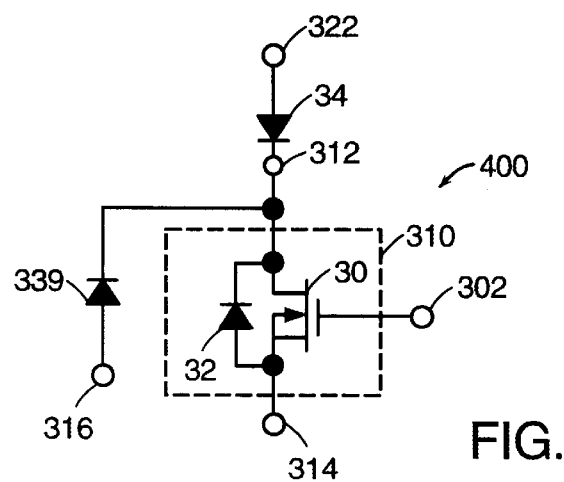

In FIGS. 7A, 7B, and 7C another embodiment of an integrated reset circuit 400 comprises a single semiconductor die 450 onto which are integrated three devices: a reset MOSFET 310; a clamp diode MOSFET 320; and a sense diode MOSFET 330. All three MOSFET devices 310, 320, 330 share a common drain connection 312 which is located on the bottom of the die 450 in FIG. 7B (not shown). The remainder of the connections to the die 450 are bonding pads comprising: a reset MOSFET gate control input termination pad 302; a reset MOSFET source lead termination pad 314; a sense diode MOSFET source lead termination pad 316; and a clamp diode MOSFET source lead termination pad 322 (which also provides a connection to the cathode of the intrinsic diode 34 of the clamp diode MOSFET). The gate control inputs 306, 308 (FIG. 7A) of both the clamp diode MOSFET 320 and the sense diode MOSFET 330 are permanently connected to their respective source connections, permanently holding the channel of each MOSFET 320,330 in a non-conductive state.

The equivalent schematic of the integrated reset circuit 400 is shown in FIG. 7C. because the channels of both the clamp diode MOSFET 320 and the sense diode MOSFET 330 are prevented from conducting only the intrinsic diodes 34,339 of the two devices are functional. Because the sense diode 339 and the intrinsic diode 32 of the reset MOSFET 310 are formed on the same die under the same process conditions their forward voltage drops will track closely, provided that the current densities in the two devices are comparable.

Figure 8A:
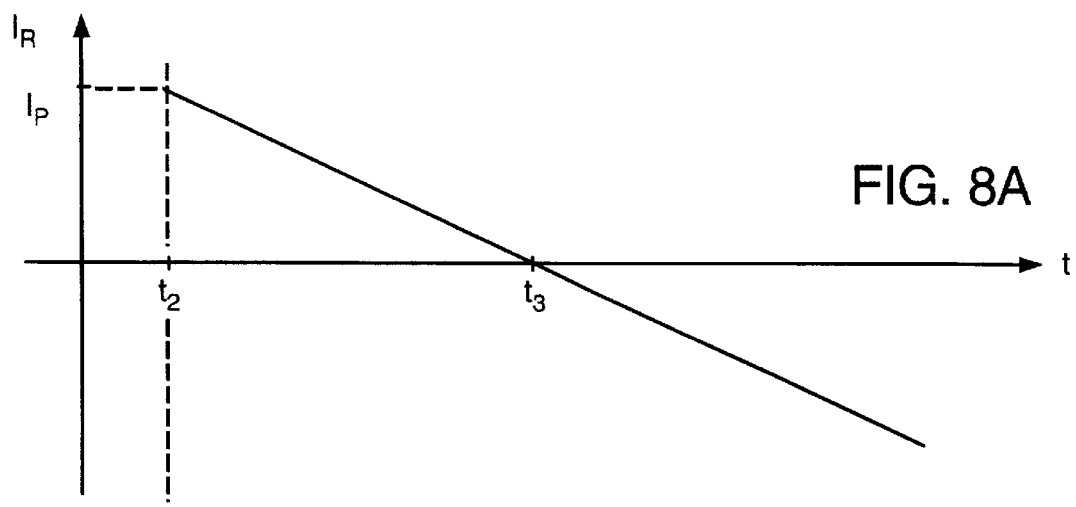
FIGS. 8A through 8C shows a waveform for a converter comprising the integrated reset circuit of FIGS. 7A through 7C.
Figure 8B:
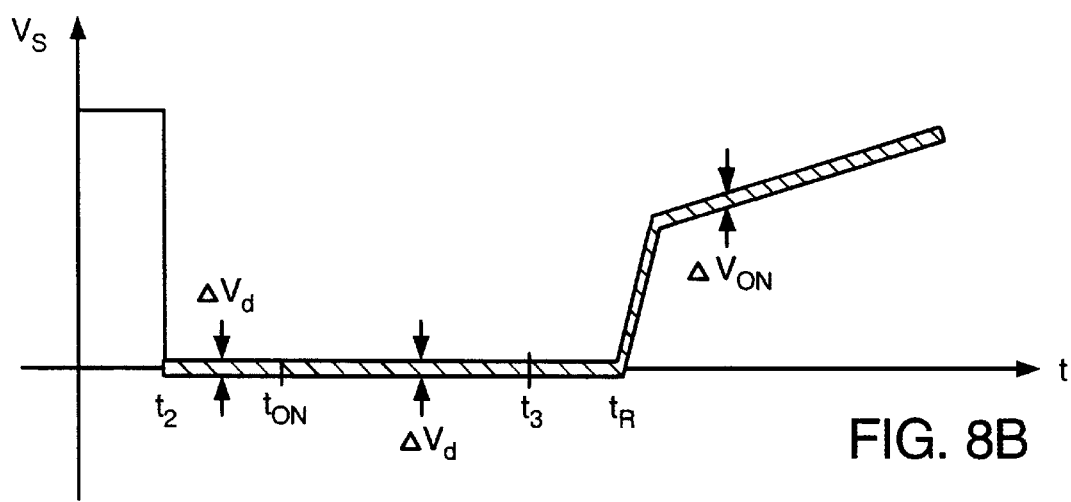
Figure 8C:
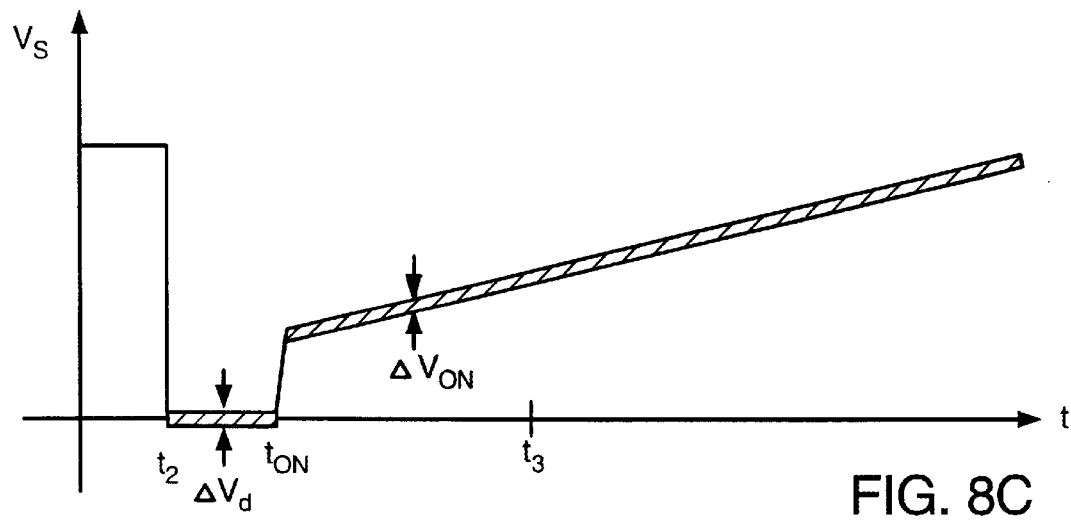

Waveforms for the converter 10 of FIG. 1, comprising the integrated reset circuit 400 of FIGS. 7A–7C, are shown in FIGS. 8A through 8C. All of the elements of FIG. 1 are replaced with the elements in FIG. 7C having the same reference numbers, with the exception of the sense diode 38 which is replaced with the intrinsic diode 339 of FIG. 7C. As in the previous example, FIG. 8B is for a high voltage reset MOSFET with a relatively high channel resistance and FIG. 8C is for a low voltage reset MOSFET with a relatively low channel resistance. Between time t2 and $t_{on}$ the main switch 14 is open, the reset MOSFET 30 has not yet been turned on, and reset current $I_R$ is flowing in the intrinsic diode 32. During this period, the voltage Vs is the difference between the forward voltage drops in the intrinsic diodes 339, 32. Since, as noted above, these forward voltage drops are essentially equal, their difference will essentially equal zero and the range of variation in their difference, ΔVd (FIGS. 8B, 8C), will be much smaller and more predictable than the difference (ΔV1, FIG. 3B) in the prior art converter. At time $t_{on}$ a signal (not shown) at the gate control input 302 enables the reset MOSFET 30. After time $t_{on}$, the voltage Vs will be the difference between the forward voltage drop of the intrinsic diode 339 and the drain-to-source voltage of the reset MOSFET (i.e., the voltage between terminals 312 and 314, FIG. 7C). The characteristics and value of this voltage after $t_{on}$ is dependent on the type of MOSFET device.

FIG. 8B shows the voltage Vs for a high voltage MOSFET with a high channel resistance. Essentially all of the reset current $I_R$ continues to flow in the intrinsic diode 32 after time $t_{on}$ and, since the voltage drop in diode 32 continues to be essentially equal to the forward voltage drop of the intrinsic diode 339, the voltage Vs remains near zero. The reset current reverses polarity at time t3 (FIG. 8A) but the intrinsic diode 32 does not recover until time $t_R$. At time $t_R$, the intrinsic diode 32 recovers and the reset current begins flowing in the channel of the reset MOSFET 30; the voltage Vs exhibits a positive step equal to the difference between the forward voltage drop in the intrinsic diode 339 and the drain-to-source voltage drop across the reset MOSFET 30 caused by the flow of reset current $I_R$ in its channel resistance.

FIG. 8C shows the voltage Vs for a low voltage MOSFET with a relatively lower channel resistance. The conditions prior to $t_{on}$ are equivalent to those in FIG. 8B. After $t_{on}$, however, essentially all of the current $I_R$ flows in the channel resistance of the reset MOSFET 30 and there is essentially no conduction by the intrinsic diode 32 and no reverse recovery period. As a result, as shown in FIG. 8C, the sense voltage, Vs, following $t_{on}$, is equal to the difference between the forward voltage drop in the intrinsic diode 339 and the drain-to-source voltage drop across the reset MOSFET 30 caused by the flow of reset current $I_R$ in its channel resistance.

As was the case for the integrated reset circuit of FIGS. 4A–4C, integration of the reset MOSFET 310 and the sense MOSFET 330 on a single die greatly reduces the component variation and mismatch issues associated with combinations of discrete elements, discussed above, and, as was the case for the circuit 300 of FIGS. 4 and 6, reduces measurement uncertainties and their impact on dynamic performance and circuit complexity.

Figure 9A:
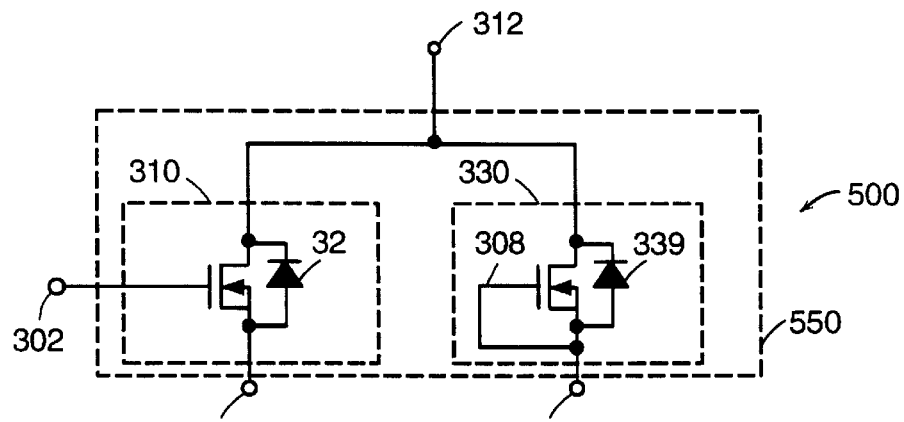
FIGS. 9A through 9C illustrate another integrated reset circuit according to the invention.
Figure 9B:
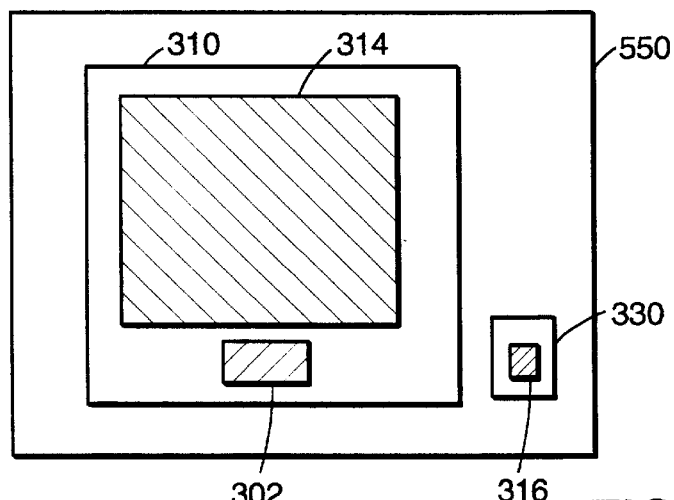
Figure 9C:
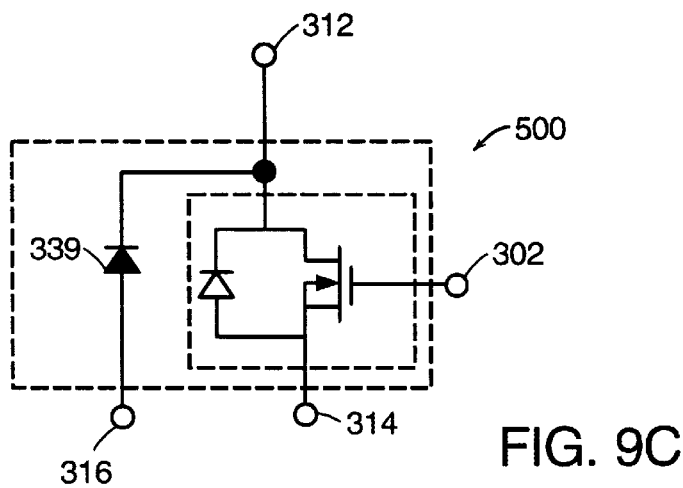

Forward converters comprising an active clamp circuit without a clamp diode 34 can benefit from the integrated reset circuit 500 shown in FIGS. 9A, 9B and 9C. The circuit 500 comprises a die 550 which comprises all of the elements of the integrated reset circuit of FIGS. 7A–7C with the exception of the clamp diode MOSFET 320. Such a circuit can be used to sense the flow of reset current, for the purposes described above, in any converter comprising any form of active clamp circuit.

Other benefits of integrated reset switches 300, 400, 500 according to the invention include reduced component count, packaging volume and component cost; a reduction in circuit manufacturing steps and assembly costs; and a reduction in parasitic inductances between components.

Other embodiments are within the scope of the following claims.

Figure 10A:
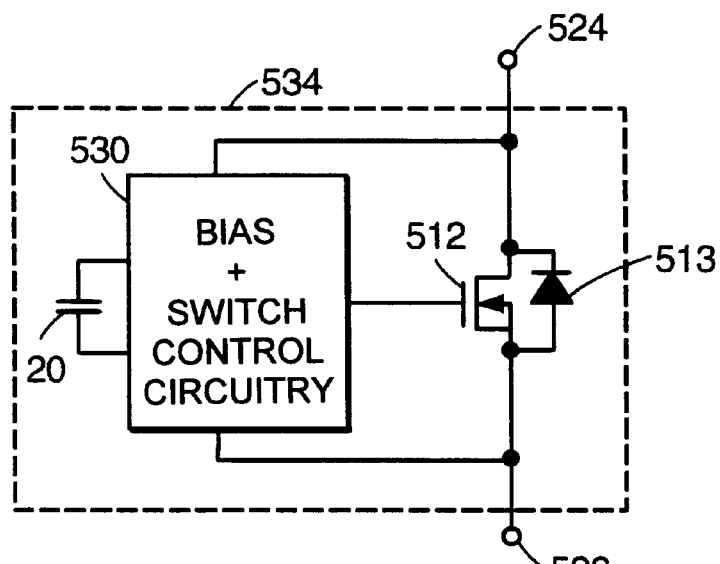
FIGS. 10A and 10B show integrated reset circuits comprising a two-terminal synchronous rectifier.
Figure 10B:
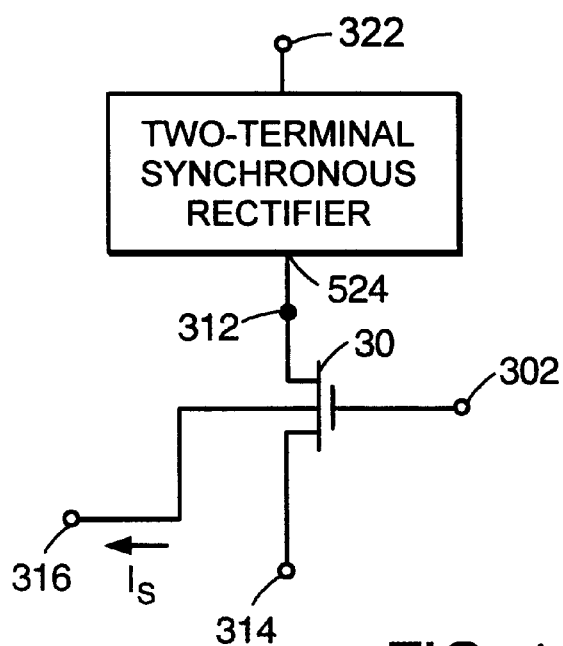

For example, the present invention may comprise one or more MOSFFTs which comprise a Schottky-barrier intrinsic diode (see, e.g., U.S. Pat. No. 5,886,383, "Integrated Schottky Diode and MOSGATED Device"). The clamp diode 34 in FIG. 1 and the clamp diode MOSFET 320 of FIGS. 4A and 7A can be replaced with a two-terminal synchronous rectifier 534. illustrated in FIG. 10A, of the kind described in U.S. patent application Ser. No. 09/499,8822 filed Feb. 8, 2000 (assigned to the same assignee as this application and incorporated by reference in its entirety). In the Figure, the two-terminal synchronous rectifier comprises a MOSFET 512 (with intrinsic diode 513); bias and switch control circuitry 530 for controlling the conductivity of the MOSFET 512; and one or more capacitors (one such capacitor 20 being shown) for generation of bias voltage. The anode and cathode connections of the two-terminal synchronous rectifier are at terminals 526 and 524 respectively. Integrating a two-terminal synchronous rectifier 534 onto a die (e.g., die 350, 450) in place of the clamp MOSFET (e.g., as shown in FIG. 10B for the circuit of FIG. 4C) will result in lower forward voltage drop when the clamp diode conducts (e.g., at light loads in variable frequency converters), thereby improving conversion efficiency.

What is claimed is:

1. An integrated circuit for use in a transformer core reset circuit, comprising,
    a MOSFET comprising a channel between a drain terminal and a source terminal, the conductivity of the channel being controlled by a gate control terminal, the MOSFET having an equivalent circuit that includes an intrinsic diode connected in parallel with the channel,
    a sense circuit for detecting a reversal of current flowing in the MOSFET and
    a diode comprising an anode terminal and a cathode terminal,
    wherein the MOSFET, the sense circuit, and the diode are integrated onto the same semiconductor die.

2. The integrated circuit of claim 1 wherein said cathode terminal is connected to said drain terminal.

3. The integrated circuit of claim 1 wherein the sense circuit comprises another MOSFET integrated onto said die, said another MOSFET comprising a channel connected between a drain terminal and a source terminal and a gate control terminal for controlling the conductivity of said channel, said another MOSFET having an equivalent circuit comprising an intrinsic diode, the cathode of said intrinsic diode connected to said drain terminal of said another MOSFET and the anode of said intrinsic diode connected to said source terminal of said another MOSFET
    wherein said channel of said another MOSFET is rendered non-conductive and said cathode terminal comprises said drain terminal of said another MOSFET and said anode terminal comprises said second source terminal of said another MOSFET.

4. The integrated circuit of claim 3 wherein said another MOSFET is rendered non-conductive by a connection between the gate control terminal of said another MOSFET and the source terminal of said another MOSFET.

5. The integrated circuit of claim 1 wherein said MOSFET comprises a sensefet having a primary source terminal and a sense source terminal, and the sense circuit comprises the sense source terminal.

6. The integrated circuit of claims 1 or 5 wherein the cathode of said intrinsic diode is connected to said drain terminal and the anode of said intrinsic diode is connected to said source terminal.

7. The integrated circuit of claim 5 further comprising terminations for making connections to both of said source terminals.

8. The integrated circuit of claim 1 wherein the diode comprises a two-terminal synchronous rectifier.

9. The integrated circuit of claim 8 in which the two-terminal synchronous rectifier comprises a MOSFET.

10. The integrated circuit of claim 9 in which the MOSFET includes an intrinsic diode.

11. The integrated circuit of claim 8 in which the synchronous rectifier includes conductivity control circuitry.

12. The integrated circuit of claim 1 wherein said diode comprises an additional MOSFET integrated onto said die, said additional MOSFET comprising a channel connected between a drain terminal and a source terminal and a gate control terminal for controlling the conductivity of said channel, said additional MOSFET being of the kind which has an equivalent circuit comprising an intrinsic diode, the cathode of said intrinsic diode connected to said drain terminal of said additional MOSFET and the anode of said intrinsic diode connected to said source terminal of said additional MOSFET
    wherein said channel of said additional MOSFET is rendered non-conductive and said second cathode terminal comprises said drain terminal of said additional MOSFET and said second anode terminal comprises said second source terminal of said additional MOSFET.

13. The integrated circuit of claim 12 wherein said additional MOSFET is rendered non-conductive by means of a connection between the gate control terminal of said additional MOSFET and the source terminal of said additional MOSFET.

14. The integrated circuit of claim 1 further comprising terminations for making connections to said drain terminal, said source terminal, said gate control terminal and said anode terminal.

15. A power converter comprising a transformer and a core reset circuit for resetting the core of said transformer, said core reset circuit comprising,
    an integrated circuit comprising a semiconductor die comprising,
        a MOSFET comprising a channel between a drain terminal and a source terminal, a gate control terminal for controlling the conductivity of said channel, the MOSFET having an equivalent circuit that includes an intrinsic diode connected in parallel with the channel, and
        a sense diode comprising an anode terminal and a cathode terminal, said cathode terminal connected to said drain terminal, the sense diode having voltage-current characteristics matched to voltage-current characteristics of the intrinsic diode.

16. The power converter of claim 15 wherein the integrated circuit further comprises a two-terminal synchronous rectifier.

17. The power converter of claim 16 wherein the two-terminal synchronous rectifier comprises a MOSFET.

18. The power converter of claim 17 wherein the MOSFET includes an intrinsic diode.

19. The power converter of claim 16 wherein the synchronous rectifier includes conductivity control circuitry.

20. The power converter of claim 15 wherein said sense diode in connected in series with a source of current.

21. The power converter of claim 15 wherein said core reset circuit further comprises a capacitor and a clamp diode connected across said capacitor.

22. The power converter of claim 15 wherein said channel of said MOSFET is connected to a winding of said transformer.

23. A power converter comprising a transformer and a core reset circuit for resetting the core of said transformer, said core reset circuit comprising,
    a semiconductor die comprising a sensefet, said sensefet comprising a reset MOSFET and a sense MOSFET, said reset MOSFET comprising a channel between a drain terminal and a source terminal and said sense MOSFET also comprising a channel between said drain terminal and another source terminal, the conductivity of each of said channels being controlled by a gate controlled terminal.

24. The power converter of claim 23 wherein said another source terminal provides a sense termination for use in detecting the voltage across the channel of said reset MOSFET.

25. The power converter of claim 23 wherein said channel of said reset MOSFET is connected to a winding of said transformer.

26. The power converter of claim 23 wherein said semiconductor die further comprises a clamp diode.

27. The power converter of claim 26 wherein and said core reset circuit comprises a capacitor and said clamp diode is connected across said capacitor.

28. The power converter of claim 23 wherein the semiconductor die further comprises a two-terminal synchronous rectifier.

29. The power converter of claim 28 wherein the two-terminal synchronous rectifier comprises a MOSFET.

30. The power converter of claim 29 wherein the MOSFET includes an intrinsic diode.

31. The power converter of claim 28 wherein the synchronous rectifier includes conductivity control circuitry.

32. An integrated circuit for use in a transformer core reset circuit, comprising, a MOSFET comprising a channel between a drain terminal and a source terminal, the conductivity of the channel being controlled by a gate control terminal, the MOSFET having an equivalent circuit that includes an intrinsic diode connected in parallel with the channel, a sense diode comprising another MOSFET, said another MOSFET comprising a channel connected between a drain terminal and a source terminal and a gate control terminal for controlling the conductivity of said channel, said another MOSFET having an equivalent circuit comprising an intrinsic diode, the cathode of said intrinsic diode connected to said drain terminal of said another MOSFET and the anode of said intrinsic diode connected to said source terminal of said another MOSFET, wherein said channel of said another MOSFET is rendered non-conductive by a connection between the gate control terminal of said another MOSFET and the source terminal of said another MOSFET, wherein the MOSFET and the another MOSFET are integrated onto the same semiconductor die and the intrinsic diode of the another MOSFET is matched to the intrinsic diode of the MOSFET.

33. The integrated circuit of claim 3 further comprising a two-terminal synchronous rectifier.

34. The integrated circuit of claim 33 wherein the two-terminal synchronous rectifier comprises a MOSFET.

35. The integrated circuit of claim 34 wherein the MOSFET includes an intrinsic diode.

36. The integrated circuit of claim 33 wherein the synchronous rectifier includes conductivity control circuitry.

37. A method comprising during an off period of a main switch in a power converter, sensing the timing of a reversal of magnetizing current in a transformer of the power converter, the sensing being done by a circuit that includes a sense diode, resetting the transformer by turning on a reset switch that includes an intrinsic diode, and arranging for the sense diode and the intrinsic diodes to have forward voltage drops that are within 20 millivolts of one another.

38. The method of claim 37 wherein said reset switch comprises a MOSFET.

39. The method of claim 37 wherein said MOSFET and said sense diode are integrated onto the same semiconductor die.

40. The method of claim 39 wherein said sense diode comprises an intrinsic diode of another MOSFET.

* * * * *

UNITED STATES PATENT AND TRADEMARK OFFICE
CERTIFICATE OF CORRECTION

PATENT NO. : 6,282,107 B1
DATED : August 28, 2001
INVENTOR(S) : Patrizio Vinciarelli It is certified that error appears in the above-identified patent and that said Letters Patent is hereby corrected as shown below:

<u>Title page,</u>
Item [56], U.S. PATENT DOCUMENTS, last reference, change "Jan" to -- Tan --.

<u>Column 2,</u>
Line 41, change "MOFET" to -- MOSFET --.

<u>Column 3,</u>
Line 38, change "timings" to -- timing --.

<u>Column 5,</u>
Line 25, change "MOSFEET" to -- MOSFET --.
Line 56, change "MOSFET" to -- MOSFETs --.

<u>Column 7,</u>
Line 41, change "because" to -- Because --.
Line 43, after "conducting" insert a comma.

<u>Column 8,</u>
Line 62, change "MOSFFTs" to -- MOSFETS --.

<u>Column 9,</u>
Line 1, change "09/499,8822" to -- 09/499,822 --.

<u>Column 10,</u>
Line 56, change "diode in" to -- diode is --.

UNITED STATES PATENT AND TRADEMARK OFFICE
CERTIFICATE OF CORRECTION

PATENT NO. : 6,282,107 B1
DATED : August 28, 2001
INVENTOR(S) : Patrizio Vinciarelli It is certified that error appears in the above-identified patent and that said Letters Patent is hereby corrected as shown below:

Column 11,
Line 6, change "controlled" to -- control --.
Line 16, delete "and".

Signed and Sealed this

Thirteenth Day of May, 2003

JAMES E. ROGAN
*Director of the United States Patent and Trademark Office*